United States Patent
Brooks

Patent Number: 5,173,849
Date of Patent: Dec. 22, 1992

[54] INTEGRATABLE SYNCHRONOUS RECTIFIER

[75] Inventor: David R. Brooks, Perth, Australia

[73] Assignee: Magellan Corporation (Australia) Pty. Ltd., Perth, Australia

[21] Appl. No.: 785,170

[22] PCT Filed: Nov. 17, 1988

[86] PCT No.: PCT/AU88/00444

§ 371 Date: May 15, 1990

§ 102(e) Date: May 15, 1990

[87] PCT Pub. No.: WO89/05058

PCT Pub. Date: Jun. 1, 1989

Related U.S. Application Data

[63] Continuation of Ser. No. 499,309, May 15, 1990, abandoned.

[30] Foreign Application Priority Data

Sep. 19, 1987 [AU] Australia ............... PI5507

[51] Int. Cl.⁵ ........................... H02M 7/217
[52] U.S. Cl. .................... 363/127; 328/26; 342/51; 363/147
[58] Field of Search ........... 363/126, 127, 147; 307/260, 261, 262, 494, 497; 328/26

[56] References Cited

U.S. PATENT DOCUMENTS

| | | |
|---|---|---|
| 3,909,700 | 9/1975 | Ferro. |
| 4,174,535 | 11/1979 | Mueller et al. ............. 363/147 |
| 4,409,500 | 10/1983 | Welland. |
| 4,412,344 | 10/1983 | Mauthe et al.. |
| 4,531,084 | 7/1985 | Hoffman. |
| 4,656,493 | 4/1987 | Adler et al.. |
| 4,692,604 | 9/1987 | Billings ..................... 235/493 |
| 4,700,286 | 10/1987 | Bingham. |
| 4,716,514 | 12/1987 | Patel. |
| 4,819,147 | 4/1989 | Bingham ..................... 363/127 |

FOREIGN PATENT DOCUMENTS

| | | |
|---|---|---|
| 38-85368 | 4/1963 | Japan. |
| 38-151109 | 6/1963 | Japan. |
| 57-59475 | 4/1982 | Japan. |
| 59-56870 | 4/1984 | Japan ...................... 363/127 |
| 60-152269 | 8/1985 | Japan. |
| 62-58879 | 3/1987 | Japan. |
| WO88/01448 | 8/1987 | PCT Int'l Appl.. |
| 1226596 | 4/1986 | U.S.S.R. .................. 363/127 |
| 1325644 | 7/1987 | U.S.S.R.. |
| 1363406 | 12/1987 | U.S.S.R.. |
| 1127579 | 9/1968 | United Kingdom. |

Primary Examiner—William H. Beha, Jr.
Attorney, Agent, or Firm—Banner, Birch, McKie & Beckett

[57] ABSTRACT

A synchronous rectifier comprising: switch means responsive to a control signal for selectively providing conduction of an applied AC signal, and driver means responsive to the applied AC signal and adapted to provide said control signal in synchronism with the applied AC signal, wherein the rectifier is integratable into VLSI "chip" form.

37 Claims, 4 Drawing Sheets

INTEGRATABLE SYNCHRONOUS RECTIFIER

This application is a continuation of application Ser. No. 07/499,309, filed May 15, 1990 now abandoned.

FIELD OF INVENTION

The present invention relates to power rectifying apparatus. Specifically, the present invention relates to an integratable rectifier structure utilising various MOS, including NMOS or CMOS implemented transistors. The invention may be of particular value where apparatus is to receive power via electromagnetic or capacitive coupling. Exemplary applications include remote identification devices and "smart" credit cards.

PRIOR ART

A simple rectifier circuit is shown in FIG. 1. It will be noticed that the circuit has been changed from the conventional representation (which would see the rectifying diode placed in the upper branch of the circuit). FIG. 1 is in accordance with a copending Australian Patent Application No. PI 5479 (inventor G. Murdoch), which describes this particular arrangement for certain applications.

The operation of the circuit is generally known, and is illustrated diagrammatically in FIG. 2. If the upper circuit branch is regarded as GROUND, FIG. 2 shows how the applied AC power causes the voltage at Point X to oscillate sinusoidally about Ground. Whenever Point X is more negative than Point Y, the diode conducts (shown by the shaded bands in the lower part of FIG. 2), and the capacitor C receives charge. At other times, the diode does not conduct, and the DC load (not shown) is supplied from the charge remaining on C, causing the voltage at Point Y to rise towards zero volts. At the next AC cycle, C is recharged as described above, and Point Y resumes its more negative voltage.

Because only one half (here, the negative half) of the AC wave is actually utilised, this circuit is termed a "half-wave" rectifier.

Prior art rectifying diodes are commonly fabricated as P-N semiconductor junctions, and as such, have been included in bipolar integrated circuit products, permitting such chips to operate directly from an AC power source, rather than requiring conversion to DC power. Examples of such bipolar products include light dimmers and Residual Current Circuit Breakers (RCCB's).

However, such rectifying devices are inherently difficult to fabricate on Very Large-Scale Integration (VLSI) production lines (which are optimised to produce Field-Effect, rather than Bipolar, devices). If the MOS (field-effect) transistors produced by such lines, are connected as diodes (by connecting the Gate and Drain terminals together), the resulting device is very inefficient, and exhibits a large forward voltage-drop, which limits the circuit efficiency. Likewise, the inherent rectification property existing between the "channel" and "substrate" (for explanation of these terms, see any standard text on VLSI design, such as Mead & Conway, "Introduction to VLSI Systems", Addison-Wesley, 1980) of a MOS transistor has been previously exploited as a power rectifier. This suffers from the twin drawbacks of frequently exhibiting poor forward conductivity, and being poorly controlled on a typical MOS fabrication line (it being not a usual mode of operating a MOS transistor). Such techniques have been used in prior art inventions, such as by "Ellsworth & Moll" in WO 88/01448.

Certain prior art inventions also disclose "full-wave" rectifying devices (e.g. "Ellsworth & Moll"). For many low-power applications, this is considered a needless complexity; a half-wave rectifier is usually adequate.

Furthermore, if the diode D were replaced by a switch, and that switch is caused to open and close at the same time as the Diode, the circuit would operate in a similar manner to that aforesaid. This arrangement is known as a "Synchronous Rectifier", since its operation depends on synchronising the operation of such a Switch with the incoming AC wave.

The inherently lower cost and lower power requirements of circuit functions (especially digital logic functions) when implemented in MOS, rather than bipolar, technology provides definite commercial advantages.

OBJECTS OF THE INVENTION

An object of the present invention is to provide a rectifier capable of being totally integrated using VLSI techniques.

A further object of the invention is to provide a rectifier which permits the fabrication, on conventional MOS/VLSI facilities, of a device suitable for direct operation from an AC power source, without having the usual external rectifying and voltage regulating circuits provided thereon.

SUMMARY OF INVENTION

Forms of the invention will be described, compatible with either NMOS or CMOS fabrication methods, however, any form of MOS may be readily adapted for use in the present invention; such adaption being included within the scope of this invention.

The present invention provides a synchronous rectifier comprising:
switch means responsive to a control signal for selectively providing conduction of an applied AC signal, and
driver means responsive to the applied AC signal and adapted to provide said control signal in synchronism with the applied AC signal,
wherein the rectifier is integratable into VLSI "chip" form.

The present invention provides a rectifier comprising first, second and third MOS transistors
the first transistor adapted to selectively couple an incoming AC signal as a rectified output,
the second and third transistors being adapted to provide the selective coupling such that the rectified output is provided except during substantially positive portions of the AC signal waveform.

The control signal is level sensitive; i.e. the switch means responds to the applied AC signal.

The rectifying device or arrangement of the present invention may be hereinafter referred to as an Integratable Synchronous Rectifier (ISR), without implying any limitation.

The present invention provides an ISR comprising:
transistor means coupled between a source of AC power and a DC voltage storage means, and
driver means, adapted to respond to an applied AC signal, said driver means being coupled to bias said transistor means "on" when the voltage potential of said applied AC signal is below a reference value, said driver means being also coupled to bias said transistor means "off" when the voltage potential of said applied AC signal is above said reference value, wherein said transistor means comprises a first MOS transistor, and said driver means comprises second and third MOS transistors.

The present invention provides an ISR comprising:

a gated conduction means coupled between a source of AC input and a reference potential point; and a buffer means coupled between the reference point and a supply potential point, the buffer means having an output thereof coupled to a trigger input of the conduction means, the buffer means selectively providing a first signal to the trigger input in response to an AC signal being applied to the ISR, the first signal being provided substantially during a portion of a negative peak of the applied AC signal;

the conduction means being adapted to provide a conduction path in response to the first signal so that, during the portion of the negative peak, the conduction means provides, to said reference point, a rectified signal so that a potential difference is caused to exist between the supply and reference potential points.

The present invention provides an ISR comprising a first, second and third switch means, the first and second switch means being coupled in series between a voltage potential point and a reference potential point, and providing a trigger signal to the third switch means;

the third switch means being coupled between a point at which an AC signal can be applied and the reference point, the third switch means being adapted to provide, to the reference point, a rectified form of an applied AC signal in response to the trigger signal;

the trigger signal being provided at times when the slope of the applied AC signal is not substantially positive. If no voltage comparator means is used, the duration of the trigger signal may be dependent upon the relative conductance of the first and second switch means. If such voltage comparator means is used, the duration of said first signal will be determined by the operation of said voltage comparator means.

The present invention may be incorporated in a DC voltage supply. The DC voltage supply may provide the rectifying device together with a storage capacitor coupled between the voltage reference and voltage supply rails of the rectifying device. The storage capacitor may take the form of an integrated circuit and capacitor assembly, the subject of a copending application. A zener diode, or other regulator, may additionally be coupled in parallel with the capacitor in order to provide a more stable DC supply.

The present invention may provide a rectifying circuit in which the maximum possible driving voltage is applied to the rectifying transistor so as to turn it "on" (rather than merely connecting it as a diode) thereby achieving a maximum efficiency, and minimising the area required on the chip for this transistor.

The present invention may provide an ISR suitable for use in any device, including a transponder, the device being adapted to receive, inductively, power from an external source, the received power being in the form of an AC signal, the ISR being coupled to rectify the AC signal and provide a storage capacitor with power, the stored power being made available for the device's circuitry.

Preferred embodiments of the present invention will now be described with reference to the accompanying drawings, wherein.

It should be noted that, although the following description is made with reference to a CMOS N-WELL implentation of the ISR, other MOS implementations are possible. For example, a CMOS P-WELL ISR will provide opposite voltage polarities with respect to an N-WELL ISR.

Figure 1:
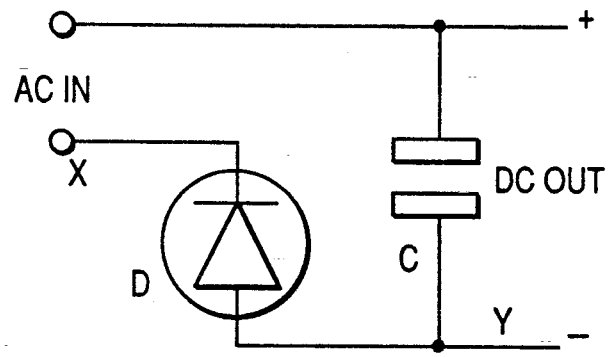
FIG. 1 shows a half-wave rectifier, according to prior art.
Figure 2:
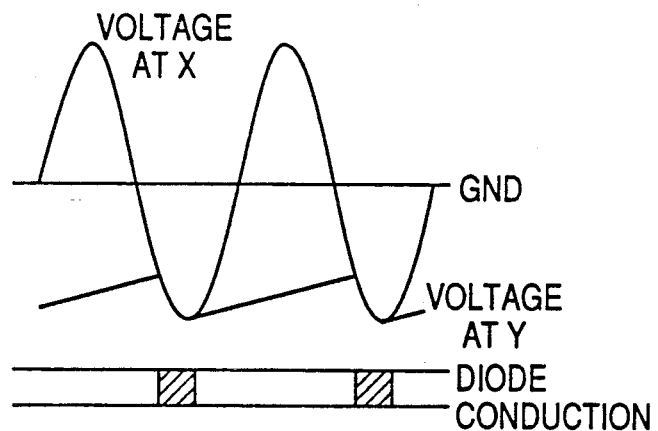
FIG. 2 illustrates diagrammatically the operation of such a prior art rectifier.
Figure 3:
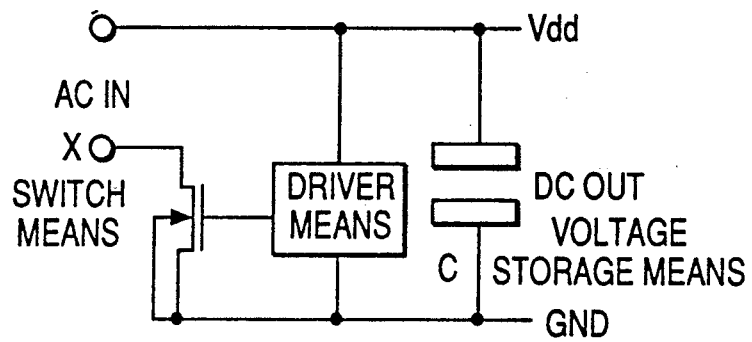
FIG. 3 shows an Integratable Synchronous Rectifier (ISR) according to the present invention.

FIG. 3 shows a basic implementation of the present invention, which will be discussed in more detail with regard to FIGS. 4 and 5. The capacitor C does not form a part of the present invention. The rectifying device utilises a MOS (field effect) transistor, so arranged as to function as a Synchronous Rectifier. Since the present invention makes use of no circuit devices except MOS transistors it is inherently well-suited for implementation on VLSI chips. NMOS and CMOS are most suitable, however other known implementations can be contemplated.

To this end, the present invention may be utilised either alone, or in conjunction with a suitable voltage regulating function. Where a voltage regulating function is provided, either of the well-known Series or Shunt regulator arrangements may be used. The Shunt form is of particular merit where an all-integrated power supply circuit is desired, due to its ability to limit the voltage at its input, thereby protecting the VLSI chip from excessive voltages. Series regulators do not offer this feature.

The transistors are used in their normal (gate-controlled conduction) mode.

In the rectifier device shown in FIG. 3 wherein the maximum possible driving voltage is applied to the rectifying transistor so as to maximize its conductivity (rather than merely connecting it as a diode).

Figure 4:
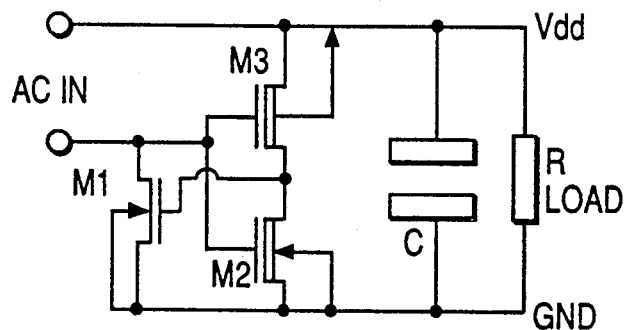
FIG. 4 shows a CMOS implementation of a first embodiment of the ISR.

The CMOS ISR of FIG. 4 comprises three MOS transistors M1, M2 and M3. M1 and M2 may be N-channel transistors and M3 may be a P-channel transistor. M2 and M3 operate in opposite synchronism, i.e. if M2 is ON, M3 is OFF, and vice versa. M1 is of a sufficient size to enable the device to carry the required power from the AC signal input.

The capacitor C may be an 'off-chip' component. Alternatively, the capacitor may be embodied in the VLSI chip and/or by utilising existing stray chip capacitance. The capacitor may provide a storage means for storing rectified energy and providing a substantially constant DC output voltage while an AC signal is applied to and being rectified by the ISR.

For the purpose of description, assume the capacitor has substantially no energy stored therein and all transistors are off. An AC signal may be applied to the ISR at 'AC-in'. In response to the rising or falling part of each applied AC cycle, the ISR may rectify the applied AC signal in the following manner. Firstly, as the AC voltage rises above Vdd, M2 turns on, M1 and M3 are off. The rising AC voltage may have no effect on the ISR i.e. may not cause the ISR to provide an output. As the applied AC voltage begins to fall, M2 is turned off, M3 turns on. With M3 on, M1 triggers on, thereby providing a conduction path between a terminal at which the AC signal is applied and GND. AC current thereby flows to GND and into the storage capacitor coupled between Vdd and GND until M1 is turned off. As the applied AC voltage begins to once again rise, M2 is turned on and in this way M1 may turn off. The AC voltage during the rising part of the cycle of the applied AC signal provides no ISR output. During the rising part of the AC signal cycle M2 is turned on, but since little voltage is stored in the storage capacitor from the first negative part of the applied Ac signal cycle, Vdd only has a proportionately small voltage potential thereon.

As the applied AC voltage begins to again fall, M2 turns off, M3 on, causing M1 to turn on, thereby causing current to flow through M1 to GND to the voltage storage capacitor. This time, the gate voltage turning on M1 is increased by the voltage increment stored on the supply capacitor of the previous cycle. As the applied AC voltage again rises, M1, M3 are turned off and M2 is turned on. This cycle continues until the applied AC signal is removed, i.e. voltage is supplied via the ISR to the storage capacitor except when the applied AC voltage rises. The storage capacitor may provide a DC supply potential or voltage to other (load) devices coupled between Vdd and GND. For example, the Load R shown in FIG. 4 could be a transponder. A characteristic of the present invention is that the voltage already stored on or in the capacitor C, itself serves to enhance the conductivity of M1, by boosting the applied gate voltage.

Figure 5:
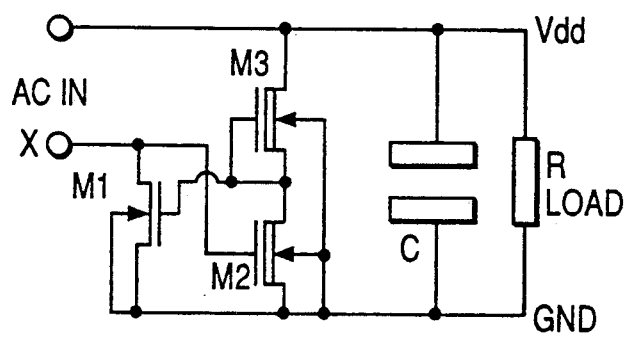
FIG. 5 shows a NMOS implementation of a first embodiment of the ISR.

FIG. 5 shows the present invention, as adapted for a NMOS fabrication process. This process cannot provide P-channel transistors, so M3 becomes a NMOS Depletion device and rather than receiving its switching trigger directly from the applied AC signal, it is on continuously thereby providing (in effect) a resistive load for M2.

From the above description, it can be seen that M2, M3 function to form a driver, buffer or inverter stage for M1. M1 provides the AC signal rectification, by selectively applying the AC signal, or part(s) thereof, through M1 and GND to a voltage storage device. M2, M3 merely function to trigger M1, that is, to provide the AC signal selection.

Unlike common CMOS design practice, M2, M3 may be of unequal sizes. Unequal sized buffer transistors may provide a low threshold voltage. M2 may be larger than M3. The size of each transistor depends on the fabrication technology chosen. M2 may be as large as possible and M3 may be as small as possible. A size guide for M2, M3 is that the larger M2 and the smaller M3, the more efficiently but also more slowly the ISR operates and also the transistors occupy valuable chip real estate (area).

M1 must be chosen to be of sufficient size to enable the selected AC power to pass through without damaging itself, or causing an unacceptable forward voltage drop. While M1, M3 are off and M2 is on, the applied AC signal may rise to any voltage level, the limit being the point at which the ISR is destroyed by over-voltage.

In order to minimise the possibility of a latch-up occurring in the buffer of the ISR, the rectifier transistor M1 should be well segregated from the boundaries of "well" structures in the silicon of the chips, i.e. M1 may conveniently not be fabricated in a "well". This is because the voltage at the AC-in point necessarily swings outside the span of the Gnd and Vdd rails during operation and carries with it the appropriate terminal of M1. Should conduction from the substrate into the M1 terminal occur as AC-in swings negative, such conduction will only aid the operation of M1. Nevertheless, M1 will conveniently be made of sufficient size that the requisite current may be passed without forward-biasing the diffusion/substrate diode (this typically occurs at an AC-in voltage of about $-0.7$ V).

M2 may advantageously also not be fabricated in a "well". The connection to the gate of the P-channel device M3 may not cause latch-up problems if it is fabricated in polysilicon or metal.

Following usual MOS design practice, the substrate connections of M1 and M2 should be returned to the Gnd point. The substrate of M3 will be returned to Vdd in the CMOS implementation (FIG. 4), and to Gnd in the NMOS implementation (FIG. 5).

With regard to a preferred embodiment of the present invention, in its CMOS implementation, as shown in FIG. 4, the following details a PSPICE circuit file. (PSPICE, an industry-standard MOS circuit-simulation computer program, is published by MicroSim Corporation, Irvine, Calif.). The corresponding circuit schematic is given in FIG. 4.

Figure 6:
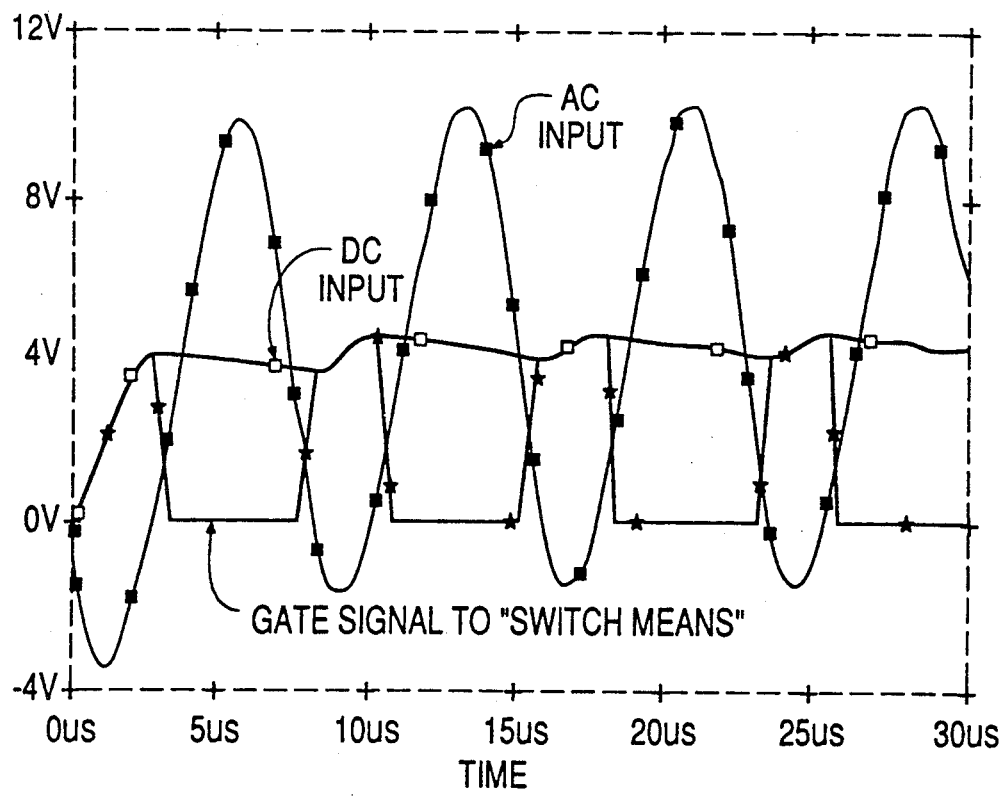
FIG. 6 illustrates a PSPICE model performance simulation of an ISR according to FIG. 4.

Simulation results, for a low-power application, are also presented (in FIG. 6). The PSPICE output plot shows the circuit's start-up behaviour, the output voltage, and the drive signal to the transistor M1. The PSPICE file is as follows:

---

Synchronous Rectifier - Basic Type
*
*Output Load
Rload       1 0 1k
Cresv       10 56n
*
*AC Supply
Vin         1 2 sin (0.6 132kHz)
*
*Device models - typical for a 3u CMOS process
.Lib mos.lib
*
*"Switch Means" - it could be made much wider if desired,
*                 which would reduce the forward voltage
*                 drop
M1 2 3 0 0 ntarg L=3u w=300u
*
* "Driver Means" - the basic 2-transistor inverter
m2 3 2 0 0 ntarg L=3u w=30u    ;Note the unusual size ratio
m3 3 2 1 1 ptarg L=3u w=6u     ; at M2/M3

```
.probe
.tran 0.2u 30u
.end
```

Figure 7:
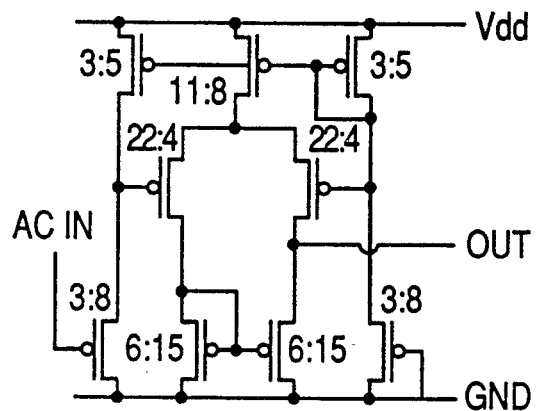
FIG. 7 shows a preferred form of a Voltage Comparator means, used in a second preferred embodiment of the present invention; transistor sizes are shown in microns, width:length.

Either the CMOS or NMOS versions of the present invention as hereinbefore described may be given an improved performance (greater electrical efficiency) by adapting the circuit to provide more exact switching of the "switch means" (i.e. M1). Practically, this means separating the input of the buffer M2/M3 from the AC-in point, and interposing some form of sensing circuit (the aforesaid "voltage comparator means" as shown in FIG. 7), adapted to provide a substantially sharp driving signal as the AC-in voltage passes above or below that of the Gnd rail. This has two beneficial effects: (a) The transistor M1 is turned on and off much more rapidly, thereby reducing electrical losses therein while it is switching (and may therefore have relatively high electrical resistance), and (b) The voltage (at AC-in) at which switching occurs may be brought closer to that of the Gnd rail, so further reducing losses. The basic circuit exhibits some conduction while AC-in is positive with respect to Gnd, which represents a loss of energy from the storage means.

Where such a Voltage Comparator is used, the buffer (M2/M3) will preferably be constructed or sized according to conventional techniques rather than using the very wide M2 transistor described above. This is because the voltage sensing function is now performed by the Voltage Comparator Means, while the Buffer is solely required to drive the M1 transistor as efficiently as possible.

Figure 8:
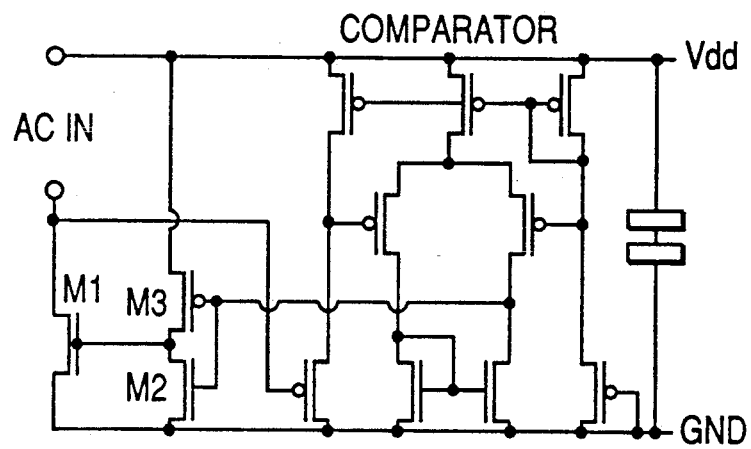
FIG. 8 shows a CMOS implementation of a second preferred embodiment, of the present invention.

With respect to FIG. 4, a suitable Voltage Comparator Means is shown in FIG. 7. The AC-in, Vdd and Gnd rails correspond to those of FIG. 4, while the Out line connects to the gates of M2/M3 in that Figure. A complete rectifier according to this second preferred embodiment, is shown in FIG. 8.

Figure 9:
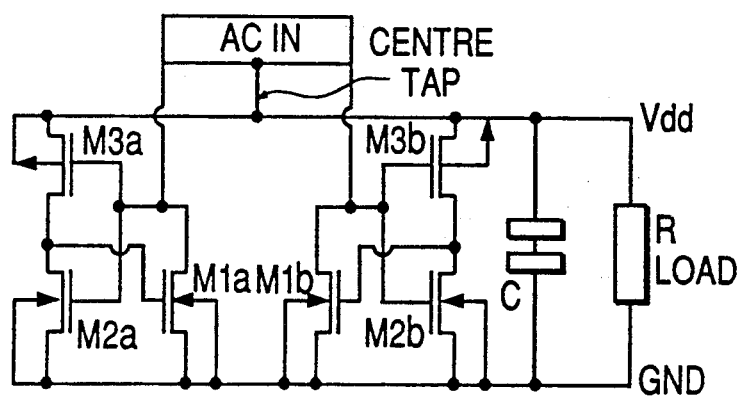
FIG. 9 shows a CMOS implementation of a first form of the ISR, adapted for full-wave rectification.
Figure 10:
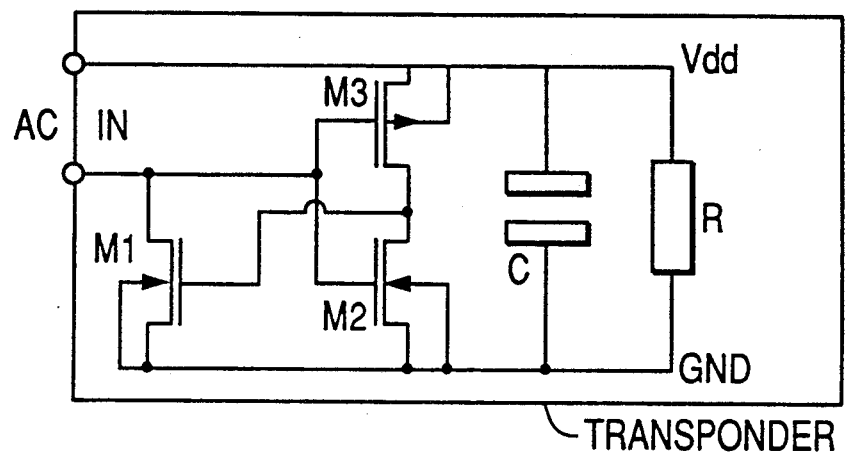
FIG. 10 shows a transponder having a CMOS implementation of a first embodiment of the ISR.
Figure 11:
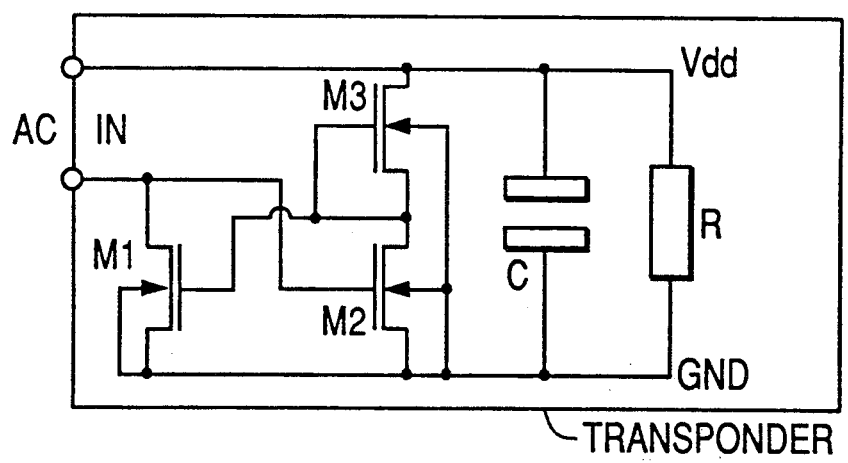
FIG. 11 shows a transponder having a NMOS implementation of a first embodiment of the ISR.

FIG. 9 shows the basic rectifier of FIG. 4, expanded to provide full-wave rectification, in the well-known "bi-phase" configuration. Any of the other forms or implementations of the present invention may similarly be utilised, as would be understood from the foregoing by those skilled in the art. Likewise, it will be understood by those skilled in the art, that the present invention may be realised with appropriate modification in the opposite polarity to that shown and described in the foregoing embodiment.

I claim:

1. A synchronous rectifier comprising:
   switch means responsive to a control signal for selectively providing conduction of an applied AC signal, and
   driver means responsive to the applied AC signal and adapted to provide said control signal in synchronism with the applied AC signal,
   wherein said switch means and driver means comprise MOS transistors having a substrate, the substrate of each of said transistors being connected directly to either a reference rail or a supply rail.

2. A synchronous rectifier as claimed in claim 1, being integratable into a same VLSI chip as the load to be served by said rectifier.

3. A synchronous rectifier as claimed in claim 1, comprising only MOS transistors operated in a gate-controlled conduction mode.

4. A synchronous rectifier as claimed in claim 2, comprising only MOS transistors operated in a gate-controlled conduction mode.

5. A synchronous rectifier as claimed in claim 1, wherein the control signal is an enhanced gate-drive signal.

6. A synchronous rectifier as claimed in claim 2, wherein the control signal is an enhanced gate-drive signal.

7. A synchronous rectifier as claimed in claim 1, wherein the control signal is provided by voltage comparator means adapted to sense the passing of the AC signal above and below a reference voltage.

8. A synchronous rectifier as claimed in claim 2, wherein the control signal is provided by voltage comparator means adapted to sense the passing of the AC signal above and below a reference voltage.

9. A synchronous rectifier as claimed in claim 1, wherein the control signal is level sensitive.

10. A synchronous rectifier as claimed in claim 2, wherein the control signal is level sensitive.

11. A synchronous rectifier as claimed in claim 1, wherein the switch means comprises one MOS transistor.

12. A synchronous rectifier as claimed in claim 2, wherein the switch means comprises one MOS transistor.

13. A synchronous rectifier as claimed iin claim 1, wherein the driver means comprises a first and a second alternately arranged transistors connected in series between the reference rail and the supply rail, the first transistor being connected to the reference rail and of a larger size than the second transistor connected to the supply rail.

14. A synchronous rectifier as claimed in claim 2, wherein the driver means comprises a first and a second alternately arranged transistors connected in series between the reference rail and the supply rail, the first transistor being connected to the reference rail and of a larger size than the second transistor connected to the supply rail.

15. A synchronous rectifier as claimed in claim 13, wherein the driver means comprises an NMOS inverter, and the first transistor is at least four times as large as the second transistor.

16. A synchronous rectifier as claimed in claim 14, wherein the driver means comprises an NMOS inverter, and the first transistor is at least four times as large as the second transistor.

17. A synchronous rectifier as claimed in claim 1, wherein the synchronous rectifier is totally integrated.

18. A rectifier comprising first, second and third MOS transistors having a substrate,
   the first transistor being adapted to selectively couple an incoming AC signal as a rectified output,
   the second and third transistors being adapted to provide the selective coupling such that the rectified output is provided except during substantially positive portions of the AC signal waveform, and
   the substrate of each of said transistors being connected directly to either a reference rail or a supply rail.

19. An integratable synchronous rectifier comprising:
   switch means coupled between a source of AC power and a DC voltage storage means, said storage means being coupled between a supply potential point and a reference potential point, and driver means adapted to respond to an applied AC signal, said driver means being coupled to bias said switch means "on" when a voltage potential of said applied AC signal is below a reference value, said driver means being also coupled to bias said switch means "off" when the voltage potential of said applied AC signal is above said reference value, wherein said switch means comprises first MOS transistor and said driver means comprises second and third MOS transistors having a substrate, the substrate of each of said transistors being connected directly to either said reference potential point or said supply potential point.

20. An integratable synchronous rectifier comprising:

gated conduction means coupled between a source of AC input and a reference potential point; and buffer means coupled between the reference potential point and a supply potential point, the buffer means having an output thereof coupled to a trigger input of the gated conduction means, the buffer means selectively providing a first signal to the trigger input in response to an AC signal being applied to the rectifier; the first signal being provided substantially during a portion of a negative peak of the applied AC signal;

the gated conduction means being adapted to provide a conduction path in response to the first signal so that, during said portion of a negative peak, the gated conduction means provides to said reference potential point a rectified signal, causing a potential difference to exist between the supply and reference potential points, wherein said gated conduction means and buffer means comprise MOS transistors having a substrate, the substrate of each of said transistors being connected directly to either of said supply and reference potential points.

21. An integratable synchronous rectifier adapted to deliver a rectified output between a supply potential point and a reference potential point, said rectifier comprising first, second and third switch means, the first and second switch means being coupled in series between said supply and reference potential points, and providing a trigger signal to the third switch means;

the third switch means being coupled between a point at which an AC signal can be applied and the reference potential point, the third switch means being adapted to provide between said supply and reference potential points a rectified form of an applied AC signal in response to the trigger signal;

the trigger signal being provided at times when the level of the applied AC signal is either above or below the level of said reference potential point; and said switch means comprising MOS transistors having a substrate, the substrate of each of said transistors being connected directly to either of said supply and reference potential points.

22. A rectifier as claimed in claim 18, being integratable into the same VLSI chip as the load to be served by said rectifier.

23. A rectifier as claimed in claim 19, being integratable into the same VLSI chip as the load to be served by said rectifier.

24. A rectifier as claimed in claim 20, being integratable into the same VLSI chip as the load to be served by said rectifier.

25. A rectifier as claimed in claim 21, being integratable into the same VLSI chip as the load to be served by said rectifier.

26. A rectifier as claimed in claim 18, comprising only MOS transistors operated in a gate-controlled conduction mode.

27. A rectifier as claimed in claim 19, comprising only MOS transistors operated in a gate-controlled conduction mode.

28. A rectifier as claimed in claim 20, comprising only MOS transistors operated in a gate-controlled conduction mode.

29. A rectifier as claimed in claim 21, comprising only MOS transistors operated in a gate-controlled conduction mode.

30. A rectifier as claimed in claim 22, comprising only MOS transistors operated in a gate-controlled conduction mode.

31. A rectifier as claimed in claim 23, comprising only MOS transistors operated in a gate-controlled conduction mode.

32. A rectifier as claimed in claim 24, comprising only MOS transistors operated in a gate-controlled conduction mode.

33. A rectifier as claimed in claim 25, comprising only MOS transistors operated in a gate-controlled conduction mode.

34. In a transponder adapted to receive inductive power radiated from an external source in the form of an impinging AC signal, a synchronous rectifier comprising:

switch means responsive to a control signal for selectively providing conduction of the impinging AC signal;

driver means responsive to the AC signal and adapted to provide said control signal in synchronism with the AC signal;

said switch means and driver means comprising MOS transistors having a substrate, the substrate of each of said transistors being connected directly to either a reference rail or a supply rail; and, the rectifier providing a rectified output signal to a storage capacitor of said transponder, a voltage output of the capacitor being coupled to power other circuitry incorporated in the transponder.

35. In a transponder adapted to receive inductive power radiated from an external source in the form of an impinging AC signal, a synchronous rectifier comprising:

first, second and third MOS transistors having a substrate;

the first transistor being adapted to selectively couple the impinging AC signal as a rectified output;

the second and third transistors being adapted to provide the selective coupling such that the rectified output is provided except during substantially positive portions of the AC signal waveform;

the substrate of each of the transistors being connected directly to either a reference rail or a supply rail; and, the rectifier providing the rectified output signal to a storage capacitor of said transponder, a voltage output of the capacitor being coupled to power other circuitry incorporated in the transponder.

36. In a transponder adapted to receive inductive power radiated from an external source in the form of an impinging AC signal, an integratable synchronous rectifier comprising:
- switch means coupled between a source of AC power receiving the impinging AC signal and a DC voltage storage means, said storage means being coupled between a supply potential point and a reference potential point;
- driver means adapted to respond to the impinging AC signal, said driver means being coupled to bias said switch means "on" when a voltage potential of the AC signal is below a reference value, said driver means also being coupled to bias said switch means "off" when the voltage potential of said applied AC signal is above said reference value;
- said switch means comprising a first MOS transistor and said driver means comprising a second and a third MOS transistor having a substrate, the substrate of each of said transistors being connected directly to either said reference potential point or said supply potential point; and,
- the rectifier providing a rectified output signal to the DC storage means, a voltage output of said storage means being coupled to power other circuitry incorporated in the transponder.

37. In combination, a transponder adapted to receive inductive power radiated from an external source in the form of an impinging AC signal, said transponder including receiver means adapted to receive the impinging AC signal and
an integratable synchronous rectifier comprising:
- gated conduction means coupled between the receiver and a reference potential point;
- buffer means coupled between the reference potential point and a supply potential point, the buffer means having an output thereof coupled to a trigger input of the gated conduction means, the buffer means selectively providing a first signal to the trigger input in response to the impinging AC signal, the first signal being provided substantially during a portion of a negative peak of the applied AC signal;
- the gated conduction means being adapted to provide a conduction path in response to the first signal so that, during said portion of the negative peak, the gated conduction means provides to said reference potential point a rectified signal, causing a potential difference to exist between the supply and reference potential points;
- said gated conduction means and buffer means comprising MOS transistors having a substrate, the substrate of each of said transistors being connected directly to either of said supply and reference potential points; and,
- the rectified signal being stored in a capacitor of said transponder, an output voltage of the capacitor being coupled to power other circuitry incorporated in the transponder.

* * * * *